United States Patent
Pichai et al.

(10) Patent No.: US 11,581,728 B1
(45) Date of Patent: Feb. 14, 2023

(54) SOFT BREAKER CIRCUIT

(71) Applicant: Equinix, Inc., Redwood City, CA (US)

(72) Inventors: Tikhon Suresh Pichai, Simpsonville, SC (US); David James Asher Hall, London (GB); Robert W. Salter, Novato, CA (US); Craig Pennington, Sunnyvale, CA (US)

(73) Assignee: EQUINIX, INC., Redwood City, CA (US)

( * ) Notice: Subject to any disclaimer, the term of this patent is extended or adjusted under 35 U.S.C. 154(b) by 369 days.

(21) Appl. No.: 16/731,696

(22) Filed: Dec. 31, 2019

Related U.S. Application Data

(60) Provisional application No. 62/804,594, filed on Feb. 12, 2019.

(51) Int. Cl.
*H02H 9/00* (2006.01)
*H02H 1/00* (2006.01)
*G05B 13/02* (2006.01)
*H02J 3/00* (2006.01)

(52) U.S. Cl.
CPC .............. *H02H 9/00* (2013.01); *G05B 13/028* (2013.01); *H02H 1/0007* (2013.01); *H02H 1/0092* (2013.01); *H02J 3/00* (2013.01)

(58) Field of Classification Search
CPC .......... H02H 9/00; H02H 1/0007; H02H 7/22; H02H 1/00; H02J 3/00; H02J 3/007; H02J 3/0075; H02J 3/005; H02J 3/06; H02J 3/28; H04L 69/323; H04B 3/54; H01R 13/713; H01R 25/00; H01R 27/02; H01R 25/006; G05B 15/02

USPC .............................................. 361/86–87
See application file for complete search history.

(56) References Cited

U.S. PATENT DOCUMENTS

| | | | |
|---|---|---|---|
| 2017/0125984 A1* | 5/2017 | Mergener | H02B 7/06 |
| 2018/0366885 A1* | 12/2018 | Hewitt | H01R 13/6666 |
| 2019/0050036 A1 | 2/2019 | Hall et al. | |
| 2020/0021106 A1* | 1/2020 | Thibaut | H02J 3/14 |
| 2020/0106221 A1* | 4/2020 | Lee | G06F 1/28 |

OTHER PUBLICATIONS

Goetz, C., "Mission Critical—The Case for Software-Defined Power—Intelligent power reporting vs. intelligent power delivery," Aug. 2019, 5 pp.
Joca et al., "Three-Phase AC-DC Solid-State Transformer for Low-Voltage DC Power Distribution Applications," 2016 12th IEEE International Conference on Industry Applications (INDUSCON), Nov. 2016, 8 pp.
ICE® "A Transformative Approach to Power Optimization in Data Centers," by Virtual Power Systems, Oct. 2018, 20 pp.
(Continued)

*Primary Examiner* — Danny Nguyen
(74) *Attorney, Agent, or Firm* — Shumaker & Sieffert, P.A.

(57) ABSTRACT

In some examples, an electrical power system includes a power source and a load modulator configured to receive power from the power source and to deliver power to a load zone. The electrical power system also includes a controller configured to determine a software-controlled power flow limit for the load zone. The controller is further configured to receive information indicating the power delivered to the load zone and to cause the power delivered to the load zone to remain below the software-controlled power flow limit.

20 Claims, 13 Drawing Sheets

(56) References Cited

OTHER PUBLICATIONS

News Release entitled "Virtual Power Systems and Natron Energy Announce Strategic Partnership to Drive Adoption of Software Defined Power," Sep. 2019, 3 pp.

U.S. Appl. No. 16/732,131, filed Dec. 31, 2019, naming inventors Hall et al.

U.S. Appl. No. 62/889,483, filed Aug. 20, 2019, naming inventors Hall et al.

* cited by examiner

SOFT BREAKER CIRCUIT

This application claims the benefit of U.S. Provisional Patent Application No. 62/804,594 (filed Feb. 12, 2019), the entire content being incorporated herein by reference.

TECHNICAL FIELD

This disclosure relates to data centers and, more particularly, to data center power control.

BACKGROUND

A network services exchange provider, co-location provider, or enterprise may operate a communication facility, such as a data center or warehouse. The customers of the co-location provider, or in the case of an enterprise-owned facility, departments or organizational groups, may have equipment such as network, server, and storage gear located in the communication facility. The communication facility includes one or more power sources such as mains power, batteries, and electric generators that supply power to the customers' equipment. The communication facility can include circuit breakers to prevent the current or power flow to any equipment from exceeding a predefined limit.

A controller can monitor the electrical parameters of each piece of equipment to determine the power or current flowing to the equipment and/or the voltage across the supply lines connected to the equipment. Based on these electrical parameters, the controller can detect a potential fault, a short circuit, an overcurrent or overvoltage, or some other problem with the equipment. The controller may then trip the circuit breaker to reduce or eliminate the power flow to the equipment.

SUMMARY

In general, this disclosure describes techniques for a soft-breaker or power limiter control circuit that may be especially useful for power management in communication facilities. The control circuit can control the allocation of power to a load in an electrical power system. The control circuit may be controlled by a controller to cause the control circuit to limit power to any of the branch circuits only up to some software-defined limit. The software-defined limit may be controlled by the controller according to policies, such as policies for fair allocation of power among one or more loads within a data center. The policies may be implemented using a set of rules that define conditions for increasing or decreasing the software-defined limit for a load in the electrical power system. In this way, the soft-breaker or power limited control circuit may provide intelligent and coordinated power limiting function/s such that (a) the input power to a load zone is not exceeded, and (b) any difference (surplus) between committed maximum zone load power and actual zone load power may be stored for re-use or re-allocation, for instance. Consequently, unlike a hard breaker in which over-threshold use of power results in a hard break (open circuit), the technical improvements described herein may provide a practical application of modulating an amount of power available to a load, such as a load zone in a data center, to increase or decrease the amount of available power temporarily, which may for instance allow the load to be scaled up or scaled down in response to a signal indicating a threshold amount of power has been exceeded.

In some examples, a method includes determining a software-controlled power flow limit for a load and causing a power flow to the load to remain below the software-controlled power flow limit.

In some examples, a device includes a computer-readable medium having executable instructions stored thereon, configured to be executable by processing circuitry for causing the processing circuitry to determine a software-controlled power flow limit for a load. The instructions are further configured to be executable by the processing circuitry for causing the processing circuitry to cause a power flow to the load to remain below the software-controlled power flow limit.

In some examples, an electrical power system includes a power source and a load modulator configured to receive power from the power source and to deliver power to a load zone. The electrical power system also includes a controller configured to determine a software-controlled power flow limit for the load zone. The controller is further configured to receive information indicating the power delivered to the load zone and to cause the power delivered to the load zone to remain below the software-controlled power flow limit.

The details of one or more examples are set forth in the accompanying drawings and the description below. Other features, objects, and advantages will be apparent from the description and drawings, and from the claims.

DETAILED DESCRIPTION

Figure 1:
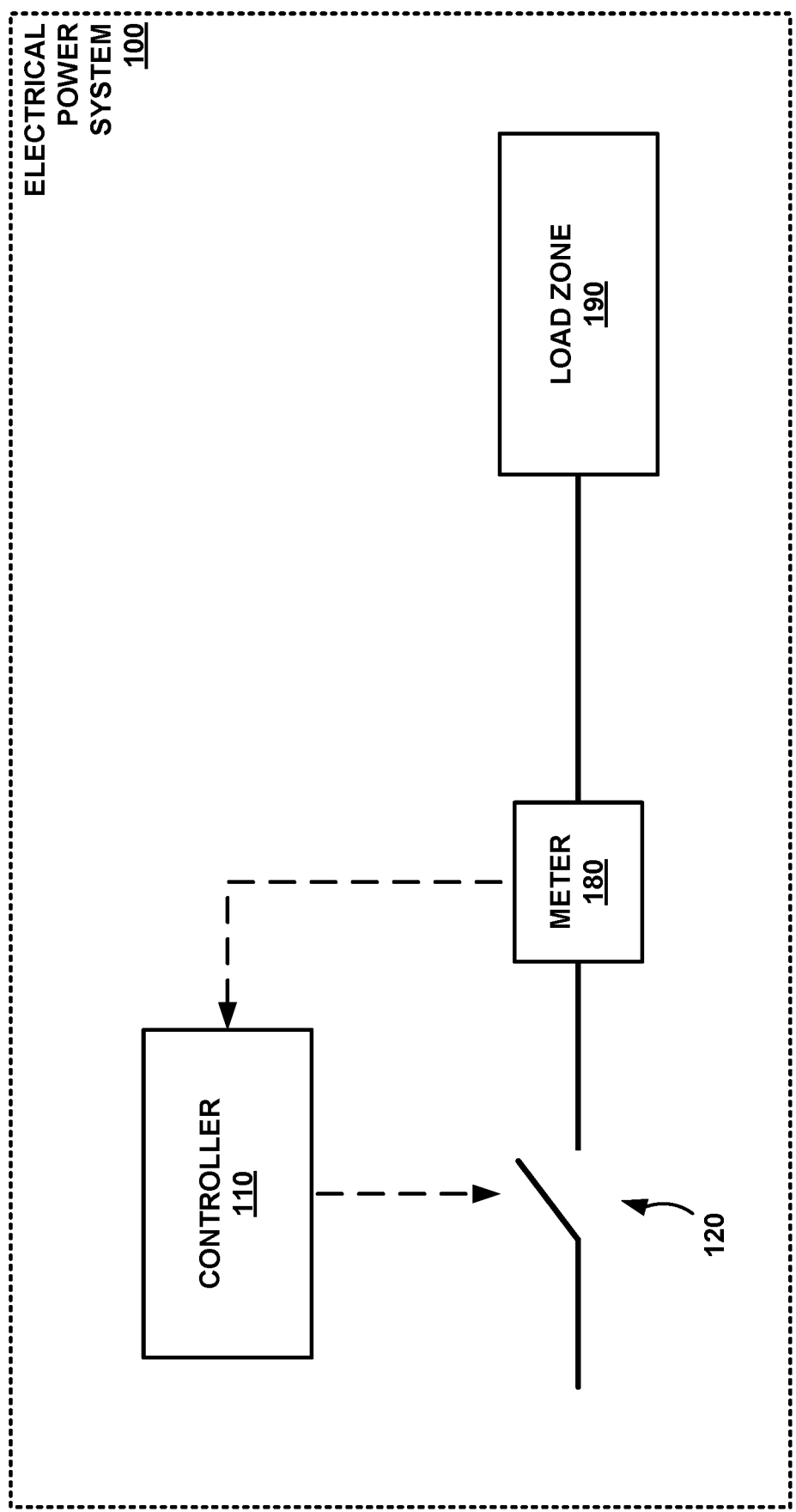
FIG. 1 shows a basic circuit for a circuit breaker and a load.

FIG. 1 shows a basic circuit for a circuit breaker and a load. In the example of FIG. 1, electrical power system 100 includes controller 110, circuit breaker 120, meter 180, and load zone 190. Electrical power system 100 is configured to deliver electrical power generated by a power source to load zone 190 via circuit breaker 120.

However, FIG. 1 shows just one example of electrical power system 100, and many other examples of electrical power system 100 may exist. For instance, in some examples, meter 180 may be positioned on the source side of circuit breaker 120. Electrical power system 100 may be configured to operate in a reverse direction, where load zone 190 acts as a power source or energy storage by releasing power to circuit breaker 120. Electrical power system 100 may also include more than one load zones connected in parallel and configured to receive power from the same power source.

Electrical power system 100 may include a micro-grid, a mixed alternating-current/direct-current (AC/DC) system, an AC/AC system, a DC/DC system, an AC bus, a DC bus, and/or any other type of electrical system. Electrical power system 100 may also be part of a power generation system such as a power plant, a power distribution system, and/or a residential or commercial power system, which may include energy storage and electrical loads. Electrical power system 100 may be a part of a communication facility such as a data center or co-location facility, any other type of building, or a vehicle such as an aerospace, marine, or automotive system. The techniques of this disclosure may be especially useful in communication facilities for controlling the power flow to server racks.

Circuit breaker 120 is configured to break the electrical link between load zone 190 and a power source. Circuit breaker 120 may include one or more switches connected between load zone 190 and the power source. The power source can include mains power, a battery or other energy storage unit, or an electric generator. In some examples, electrical power system 100 may include more than one power source. The power source can produce alternating-current (AC) or direct-current (DC) power.

Load zone 190 can include a resistive, capacitive, and/or inductive load. For example, load zone 190 can include a computer or other electronic device, an electric motor, a lighting device, and/or any other load. Load zone 190 can include a controller that throttles the power draw of load zone to avoid reaching a maximum power flow. Load zone 190 may include one or more server racks each having one or more servers drawing power as part of the load. A load zone 190 may be associated with a customer of the data center provider and include servers or other computing equipment deployed by the customer.

Controller 110 can control circuit breaker 120 based on a signal received from meter 180. Controller 110 can determine the power flow to load zone 190 based on the signal received from meter 180. For example, controller 110 can determine the current flowing to load zone 190 and the voltage across load zone 190 based on the signal. Controller 110 can then calculate the power flow by multiplying the current and the voltage. Controller 110 can open or trip circuit breaker 120 based on the power flow to load zone 190. For example, controller 110 can compare the power flow to a threshold (e.g., a power limit) and trip circuit breaker 120 based on determining that the power flow is greater than the threshold.

Thus, in examples in which the power draw of load zone 190 is greater than the threshold, controller 110 may be configured to cut off the flow of power to load zone 190. Controller 110 can use an on-off means (e.g., opening and closing circuit breaker 120) to control the magnitude of power that flows to load zone 190. Controller 110 can control circuit breaker 120 by delivering a control signal to a terminal of circuit breaker 120.

Figure 2:
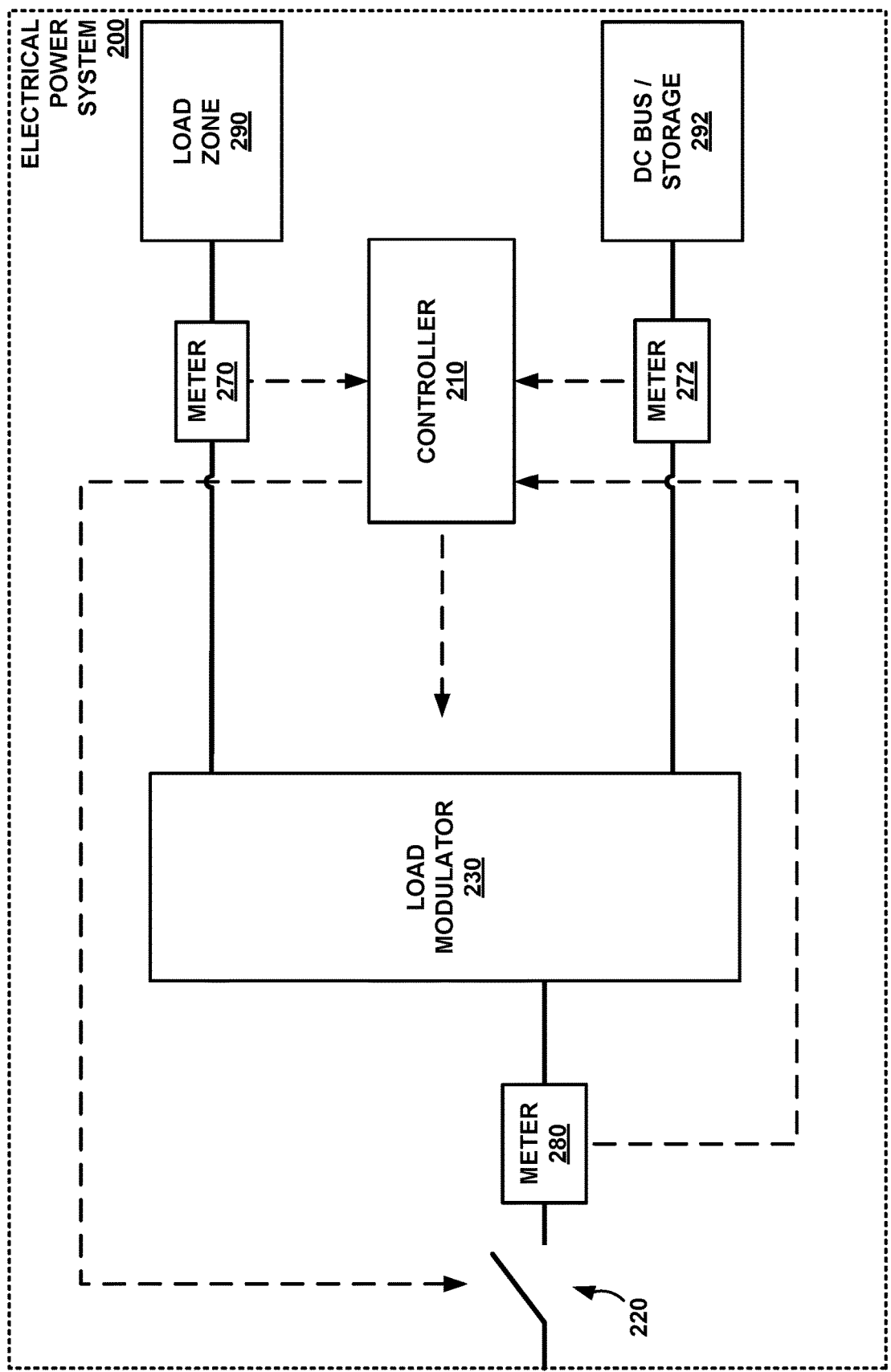
FIG. 2 shows a controller configured to control the flow of power to a load zone and an energy storage unit according to the disclosure.

FIG. 2 shows a controller 210 configured to control the flow of power to a load zone 290 and an energy storage unit 292 according to the disclosure. In the example of FIG. 2, controller 210 is configured to receive signals from meters 270, 272, and 280. The signals may indicate power flow and/or other electrical parameters such as current and voltage throughout electrical power system 200. Load modulator 230 is an example of a soft breaker or a power limiter that is positioned downstream from circuit breaker 220 and ahead of load zone 290. In the example of FIG. 2, load modulator 230 has two outputs, one coupled to load zone 290 and another coupled to DC bus/storage 292. In some examples, load modulator 230 includes one or more power converters including one or more switches. Controller 210 can control the power flows through electrical power system 200 in a soft manner to any level below a hard limit for circuit breaker 220. Controlling the power flows in a soft manner can include setting and adjusting a software-controlled power flow limit in accordance with a ruleset. Although electrical power system 200 is depicted as including load modulator 230 and DC bus/storage 292, in some example, electrical power system 200 may include only DC bus/storage 292 without a power converter or load modulator between circuit breaker 220 and DC bus/storage 292.

Controller 210 can determine whether any of the power flows through electrical power system 200 are greater than a threshold level (e.g., a software-controller power flow limit). Responsive to determining that a power flow is greater than a threshold level, controller 210 can use the soft breaker techniques described herein such as controlling a switch of load modulator 230, reducing a voltage across load zone 290, and/or transmitting a signal to load zone 290 indicating that the load controller should reduce the power draw of load zone 290. When the load controller senses that the voltage across load zone 290 has dropped below a threshold level, the load controller can reduce the power drawn by load zone 290.

Controller 210 can control the flow of power to load zone 290 by opening and closing circuit breaker 220. Controller 210 can also control the flow of power to load zone 290 by controlling the magnitude and direction of power flow to or from DC bus/storage 292. Controller 210 can also determine the magnitude and direction of power flow to or from DC bus or storage 292. Controller 210 can monitor the flow of power to load zone 290 to ensure that a power limit is not exceeded. Controller 210 can also divert excess power for storage at DC bus/storage 292, where excess power is the difference between the power flowing through circuit breaker 220 and the power draw by load zone 290. The power stored by DC bus/storage 292 can be reused or reallocated. In some examples, controller 210 may be configured to divert some of the power flowing through circuit breaker 220 and through load modulator 230 to DC bus/storage 292 to artificially limit the power that can be drawn by load zone 290.

Controller 210 can operate load modulator 230 to negotiate, allocate, limit, increase, predict, and otherwise control power flows between circuit breaker 220, load zone 290, and DC bus/storage 292. Controller 210 may be configured to keep the combined power flow to load zone 290 and DC bus/storage 292 at a safe level below the trip level of circuit breaker 220. In some examples, controller 210 ensures that the power drawn by load zone 290 is satisfied up to a maximum power limit, and controller 210 diverts any excess power to DC bus/storage 292 for storage or use elsewhere. Additionally or alternatively, controller 210 may ensure that a defined amount of power flows to DC bus/storage 292.

Controlling load modulator 230 to reduce the power flow to load zone 290 is less abrupt than opening circuit breaker 220. As a device in load zone 290 exceeds an allocated power threshold, controller 210 may be configured to reduce the voltage level of the power delivered to load zone 290 and/or to send a warning signal/message to load zone 290. In response to sensing that device in load zone 290 has reduced the power consumption, controller 210 can control load modulator 230 to increase the voltage delivered to load zone 290.

Controller 210 may be configured to allow the power flow to load zone 290 to exceed the maximum power limit for a short amount of time. During this amount of time, controller 210 can track the flow of power to load zone 290 to determine the total amount of energy flowing to load zone 290 in excess of the maximum power limit. Controller 210 can allow the power flow to exceed the maximum power limit by causing DC bus/storage 292 to release power to load modulator 230 or by increasing the maximum power limit for the load zone 290 by configuring load modulator 230 to increase the amount of power sent to load zone 290 while decreasing an amount of power sent to DC bus/storage 292. Controller 210 can also divert power to load zone 290 from other loads to accommodate the power drawn beyond the software-controlled power flow limit. In some examples, controller 210 may be configured to break the power source by opening or deactivating circuit breaker 220 in response to determining that load zone 290 is drawing more than a contracted-for power level. Additionally or alternatively, controller 210 can cause DC bus/storage 292 to release power through a DC/AC converter to load zone 290, which may be configured to receive AC power in some examples.

Although not shown in FIG. 2, electrical power system 200 may also include a central controller that defines a ruleset or a rules base for implementation by controller 210. In some examples, the central controller and controller 210 are integrated into a single controller. Controller 210 can apply the ruleset to signals received from meters 270, 272, and 280 to determine whether to adjust the software-controlled power flow limit. For example, controller 210 can temporarily increase the software-controlled power flow limit in response to determining that there is sufficient energy storage to cover a quick spike in power drawn by load zone 290. In some examples, electrical power system 200 also includes energy storage units connected to the electrical bus that delivers energy from a power source to load zone 290. The energy storage units may be configured to store and release energy for smoothing fluctuations in voltage and current along the electrical bus.

Controller 210 can also communicate the maximum power limit to load zone 290 so that load zone 290 can self-limit the power draw. When load zone 290 is drawing power in excess of a maximum power limit, controller 210 may communicate to load zone 290 that load zone 290 has exceeded the maximum power limit. Controller 210 can give load zone 290 notice that the power draw exceeds the maximum power limit before controller 210 throttles the power flow to controller 210. Alternatively or in addition, load zone 290 may experience a voltage drop in the circuit from load modulator 230, recognize that it is oversubscribed, and reduce its power load in response.

Electrical power system 200 can integrate the various elements of a soft power distribution system including the elements described herein. Electrical power system 200 can optimize the overall system performance because of the techniques described herein. For example, controller 210 may modulate the power allocated to the DC bus/storage 292 to any value between zero and a limit for meter 272, so long as the limit for meter 270 is not exceeded. Modulation can occur in a coordinated manner to maintain supply power at a desired level or within a desired range. Controller 210 may be configured to control the DC output of load modulator 230 to match the requirements for DC bus/storage 292.

The limits for meters 270 and 272 can be determined using optimization algorithms. Controller 210 may also determine and maintain the safety factor, which is equal to the limit for circuit breaker 220 minus the sum of the limits for meters 270 and 272. Controller 210 may be configured to learn and predict zone load usage patterns, negotiate with an owner or manager of zone load 290 to periodically or selectively either restrict the power flow to load zone 290, or to allow bursts above the limit for load zone 290.

Figure 3:
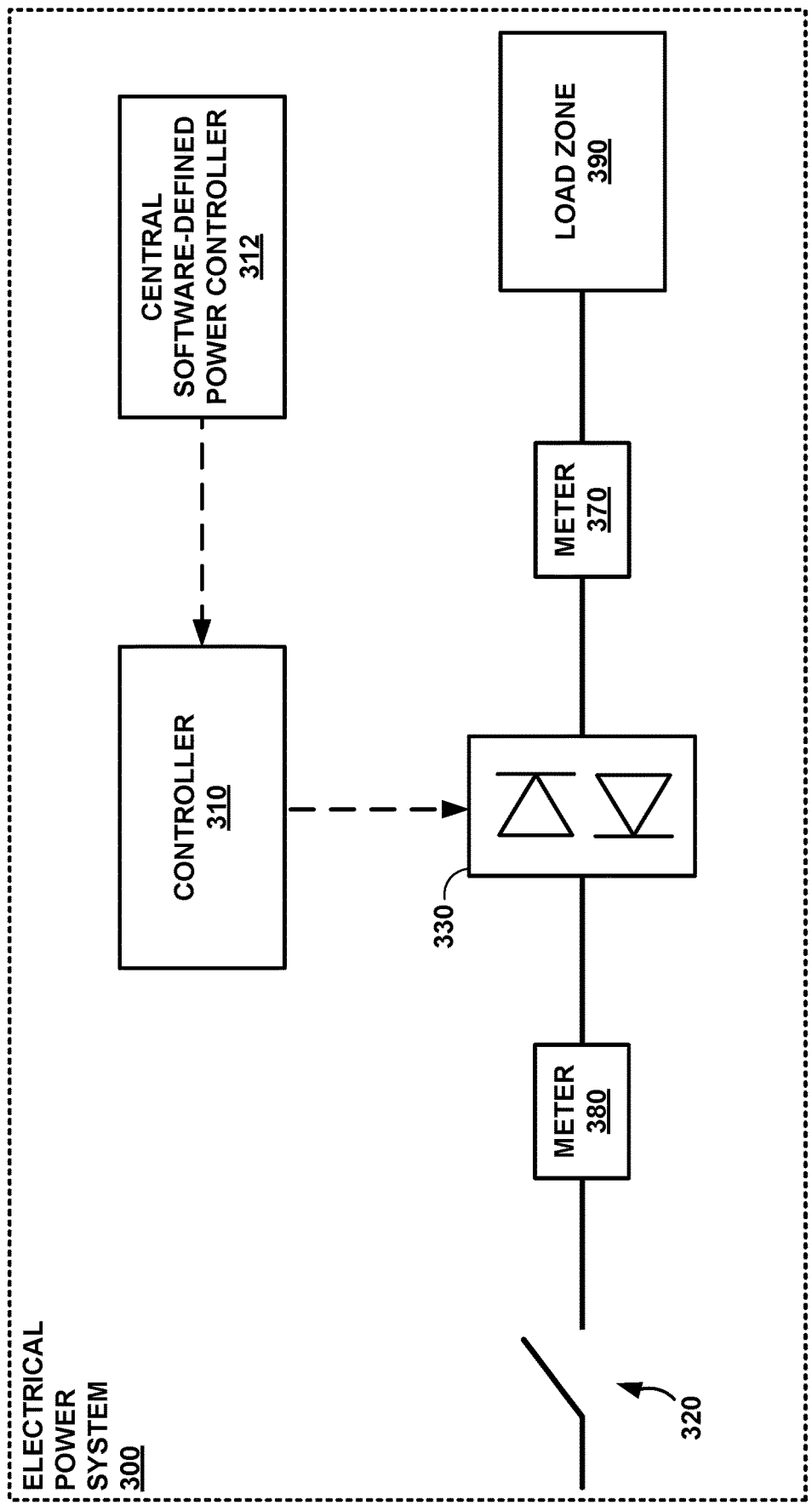
FIG. 3 shows a controller configured to control a hard breaker according to the disclosure.

FIG. 3 shows a controller 310 configured to control a hard breaker according to the disclosure. In the example shown in FIG. 3, central software-defined power controller 312 can determine a ruleset for the operation of controller 310 and load modulator 330 (e.g., a "hard breaker"). The ruleset may include a power envelope for load zone 390, where the power envelope includes a maximum power limit for the flow of power from load modulator 330 to load zone 390.

Controller 310 may be configured to receive power usage information from meters 370 and 380. Controller 310 can apply the policies and rules received from central software-defined power controller 312 to the power usage information. Controller 310 may be configured to make or break the connection at load modulator 330 based on applying a ruleset to the power usage information. Load modulator 330 may include a relay or contactor for regulating the flow of electricity between circuit breaker 320 and load zone 390. Load modulator 330 may include solid state components and/or mechanical components. Example details of monitoring power usage by a load can be found in commonly assigned U.S. Provisional Patent Application Ser. No. 62/889,483, entitled "Determining Attributes of Data Center Devices Using Power Usage Signatures," filed on Aug. 20, 2019, and commonly assigned U.S. Provisional Patent Application Ser. No. 62/876,475, entitled "Data Center Energy Management System," filed on Jul. 19, 2019, the entire contents of which are incorporated herein by reference.

Figure 4:
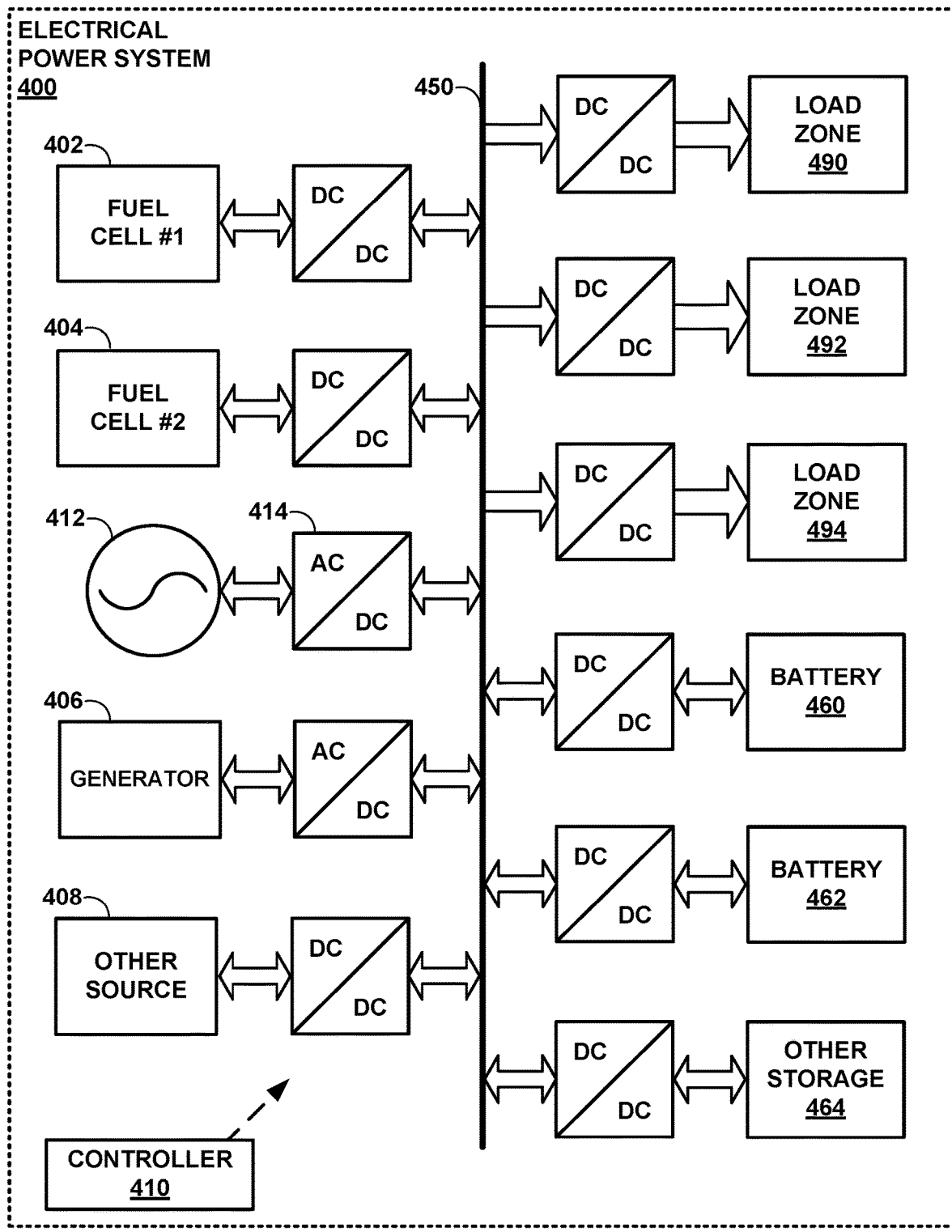
FIG. 4 shows an electrical power system including power sources, loads, and energy storage units according to the disclosure.

FIG. 4 shows an electrical power system 400 including power sources, loads, and energy storage units according to the disclosure. As shown in the example of FIG. 4, electrical power system 400 can include multiple power sources 402, 404, 406, 408, and 412, multiple storage units 460, 462, and 464, and multiple load zones 490, 492, and 494, all of which may be connected by DC bus 450.

Controller 410 may be configured to control the converters and load modulators shown in FIG. 4 to operate electrical power system as a soft distribution system. Although not shown in FIG. 4, electrical power system 400 may include load modulators that are integrated with one or more of the AC/DC converters and DC/DC converters (see, e.g., load modulator 730 in FIG. 7). Controller 410 can control the flow of power throughout electrical power system 400 by controlling the operation of the converters and load modulators of electrical power system 400.

Converter 414 is configured to convert AC power generated by power source 412 to DC power for DC bus 450. Example details of converting AC power to DC power can be found in "Three-Phase AC-DC Solid-State Transformer for Low-Voltage DC Power Distribution Applications," by Joca et al., published in the 12th IEEE International Conference on Industry Applications in 2016, the entire contents of which are incorporated herein by reference.

Any of electrical power systems 100, 200, 300, and 400 can include one or more energy storage units that can be connected between the differential lines of an electrical bus that delivers power to a load. The energy storage units may be configured to cycle through charging phases and discharging phases in which the energy storage units store and release energy to the electrical bus and the load. Using the techniques that are described with respect to FIGS. 8-12 herein, a controller can connect the energy storage units in series or in parallel between the differential lines to improve the performance and/or efficiency of the charging phases and discharging phases.

Figure 5:
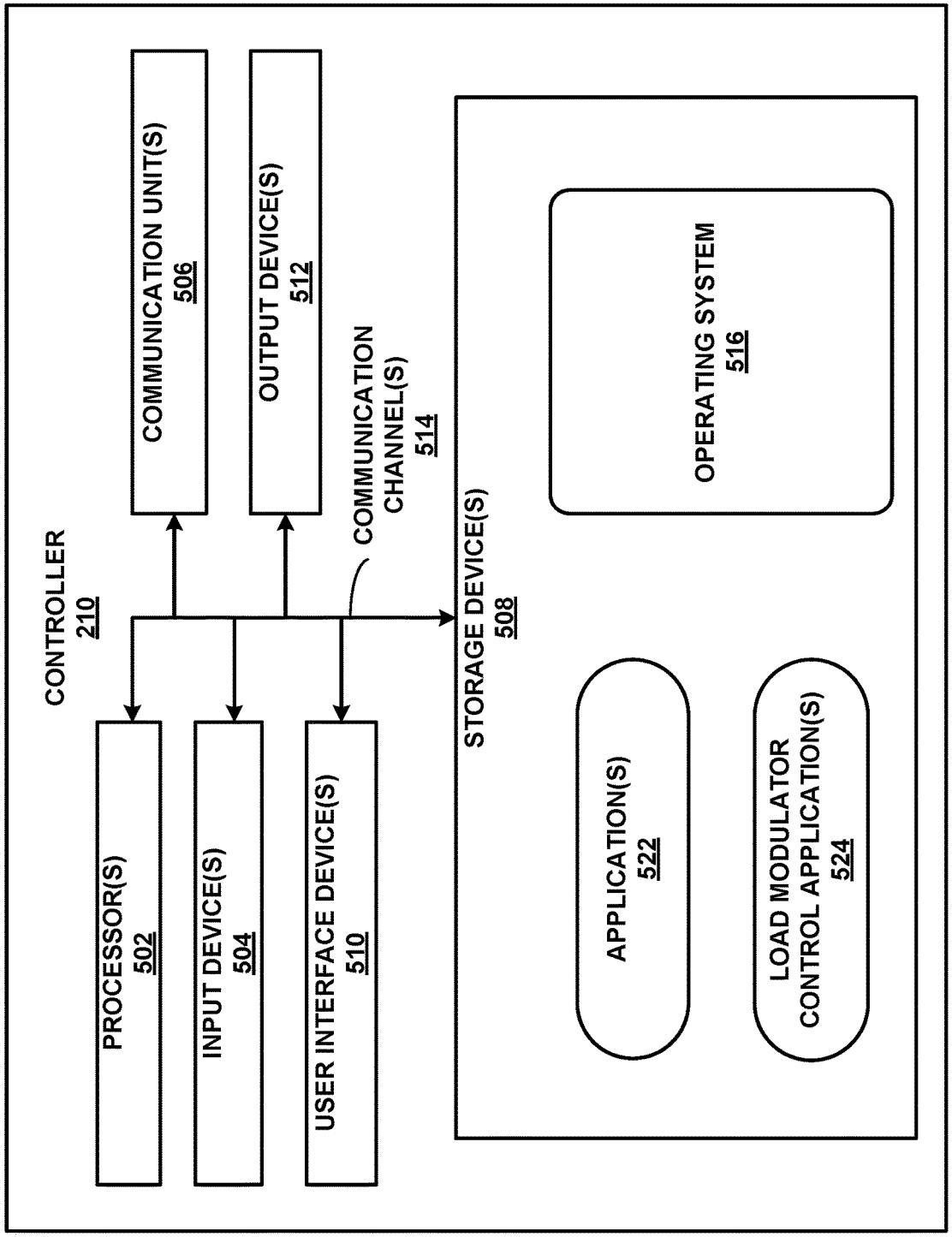
FIG. 5 shows a controller according to the disclosure.

FIG. 5 shows a controller 210 according to the disclosure. Controllers 110, 210, 310, and 410 as discussed throughout this disclosure are examples of a special-purpose computing devices. FIG. 5 shows an example controller 210 according to the disclosure. The aspects and techniques ascribed to controller 210 can also apply controllers 110, 310, and 410. More specifically, FIG. 5 is a block diagram that illustrates, in further detail, an example of controller 210 configured for allocating data center power capacity that would otherwise be unused or unsold, or is idle, in accordance with one or more techniques of the disclosure. Controller 210 may include a server or other computing device that includes one or more processor(s) 502 for executing load modulator control application 524, although controller 210 may be leveraged for other purposes in electrical power system 200 as well. Although shown in FIG. 5 as a stand-alone controller 210 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 508 may not be co-located or in the same enclosure as other components).

Processor(s) 502, in one example, is configured to implement functionality and/or process instructions for execution within Controller 210. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within controller 210 during operation. Storage device 508, in some examples, is described as a (non-transitory) computer-readable storage medium. In some examples, storage device 508 is a temporary memory, meaning that a primary purpose of storage device 508 is not long-term storage. Storage device 508, in some examples, includes volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508 in one example, is used by software or applications running on controller 210 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy disks, Flash memories, or forms of electrically programmable memories (EPROM) or electrically erasable and programmable (EEPROM) memories.

Controller 210, in some examples, also includes one or more communication units 506. Controller 210, in one example, utilizes communication units 506 to communicate with external devices via one or more networks, such as one or more wired/wireless/mobile networks, network 502, etc. Communication units 506 may include a network interface card, such as an Ethernet card, an optical transceiver, a radio frequency transceiver, or any other type of device that can send and receive information. Other examples of such network interfaces may include 3G, 4G and WiFi radios. In some examples, controller 210 may use communication unit 506 to communicate with an external device, such as sensors 270, 272, and 280, converters 230 and 240, or any component within or external electrical power system 200, whereby any of one or more of above-mentioned communication protocols may be used as examples for external communications. In some examples, communication unit(s) 506 and input device(s) 504 may be operatively coupled to controller 210. For example, controller 210 may receive a communication from an analog input device indicating an amperage, voltage, or other signal at the input device. Depending on implementation, digital signaling techniques, analog signaling techniques, or any combination thereof, may be used by controller 210 for the purpose of allocating data center power capacity that would otherwise be unused or unsold, or is idle, in accordance with the disclosure.

Controller 210, in one example, also includes one or more user interface devices 510. User interface devices 510, in some examples, are configured to receive input from a user through tactile, audio, or video feedback. Examples of user interface device(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in controller 210. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Controller 210 may include operating system 516. Operating system 516, in some examples, controls the operation of components of controller 210. For example, operating system 516, in one example, facilitates the communication of one or more applications 522 and load modulator control application 524 with processors 502, communication unit 506, storage device 508, input device 504, user interface devices 510, and output device 512.

Application 522 and load modulator control application 524 may also include program instructions and/or data that are executable by controller 210. Load modulator control application 524 may include instructions for causing a special-purpose computing device to perform one or more of the operations and actions described in the present disclosure with respect to controller 210. Load modulator control application 524 may include instructions that cause processor(s) 502 of controller 210, equivalently controller 210 itself, to perform any of the example operations described in commonly assigned U.S. patent application Ser. No. 15/969, 615, which published as U.S. Patent Application Publication No. 2019/0050036, entitled "Rack Level Power Control," filed on May 2, 2018, the entire contents of which are incorporated herein by reference.

Figure 6:
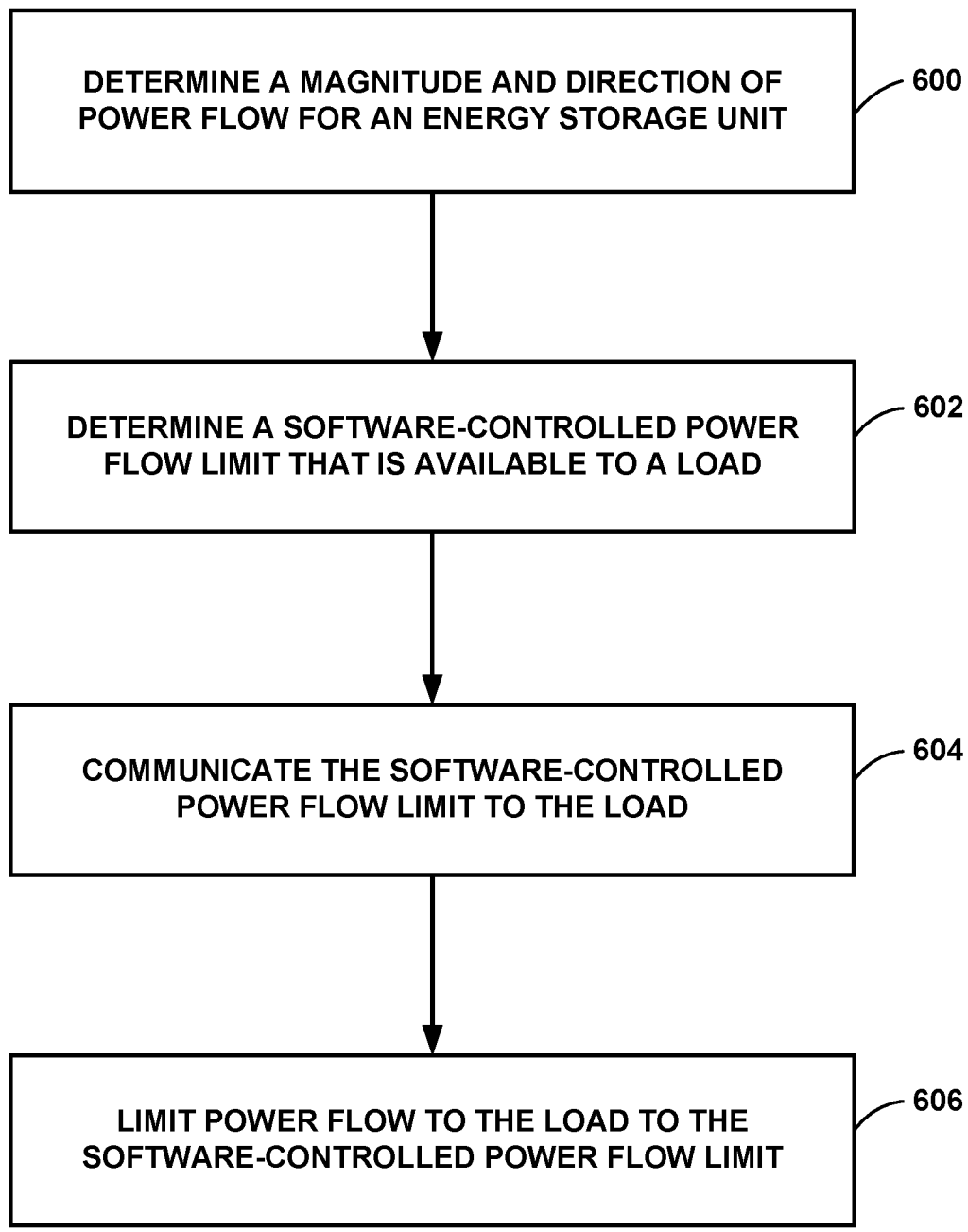
FIG. 6 shows a flowchart of an example process for controlling an electrical power system.

FIG. 6 shows a flowchart of an example process for controlling an electrical power system. The techniques of FIG. 6 are described with reference to controller 210 shown in FIG. 2, although other components may exemplify similar techniques. FIG. 6 includes operations 600 through 606, which may be performed in a different order than what is shown in FIG. 6. Additional operations, beyond operations 600 through 606, may be performed in other examples. Controller 210 may be configured to perform any of operations 600 through 606, or any and all other techniques described with respect to FIG. 6.

In the example of FIG. 6, controller 210 determines a magnitude and direction of power flow for energy storage unit 292 (600). Controller 210 can receive a signal from meter 272 that indicates a current, voltage, or power flowing to or from energy storage unit 292. Using the signal, controller 210 can determine the power flow for energy storage unit 292.

In the example of FIG. 6, controller 210 determines a software-controlled power flow limit that is available to load 290 (602). The maximum power available to load 290 can be based on the maximum power allowed through circuit breaker 220. The maximum power available to load 290 can also be based on the maximum power available from energy storage unit 292. In some examples, the maximum power available to load 292 is the sum of maximum power allowed through circuit breaker 220 plus the maximum power available from energy storage unit 292.

In the example of FIG. 6, controller 210 communicates the software-controlled power flow limit to load 290 (604). Controller 210 can transmit a signal to load 290 that indicates the magnitude of the maximum available power limit so that load 290 maintains a power draw that is below the maximum available power limit. Load 290 may include a load controller for controlling the operation of load 290. The load controller can reduce the power draw by, for example, reducing the operating frequency of load 290 (e.g., the clock frequency of a computer), reducing a number of servers in operation, or other action.

In the example of FIG. 6, controller 210 limits the power flow to load 290 to the software-controlled power flow limit (606). Controller 210 can limit the power flow by controlling a switch in load modulator 230. Load modulator 230 may include one or more power converters including one or more switches. Controller 210 can control the power flow to load 290 by activating or deactivating the switch (e.g., using pulse-width modulation). In some examples, controller 210 adjusts the software-controlled power flow limit based on a ruleset. Controller 210 can apply the ruleset to signals received from meters 270, 272, and 280 to determine a new software-controlled power flow limit.

Figure 7:
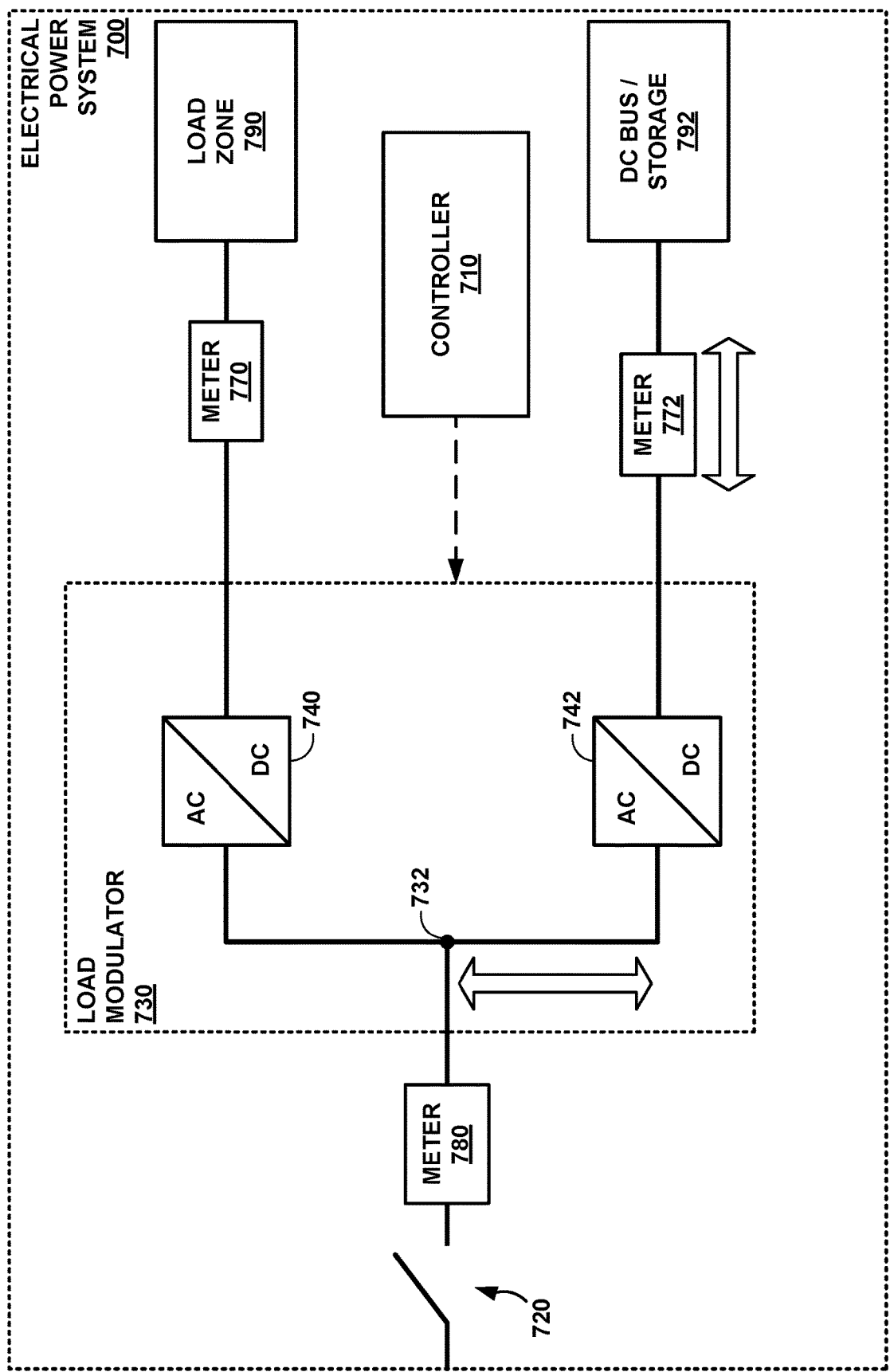
FIG. 7 shows a controller configured to perform soft power limiting according to the disclosure.

FIG. 7 shows a controller 710 configured to perform soft power limiting according to the disclosure. In the example of FIG. 7, load modulator 730 includes converters 740 and 742 configured to receive power at node 732. Converters 740 and 742 may be commercially available AC/DC converters. Controller 710 can control the operation of converters 740 and 742 to achieve a software-controlled power flow limit for the power flow to load zone 790 and/or DC bus/storage 792.

Electrical power systems 800, 900, and 1100 shown in FIGS. 8, 9, 11A, and 11B can be used together with any of electrical power systems 100, 200, 300, 400, and 700. In particular, the techniques of FIGS. 8-12 can be used in elements 290, 292, 390, 460, 462, 464, 490, 492, 494, 790, and 792. Energy storage units 820, 830, 840, 930, 940, 950, 960, 1120, and/or 1130 may be used along a transmission line or electrical bus between a power source and a load to compensate for spikes and dips in the supply power, voltage, and/or current. For the example electrical power system 100 shown in FIG. 1, energy storage units may be coupled along the transmission line between a power source and circuit breaker 120, between circuit breaker 120 and meter 180, and/or between meter 180 and load zone 190. In some examples, the transmission line shown in FIG. 1 between the power source and load zone 190 is a set of differential lines (e.g., power and ground, or high- and low-side power lines).

Figure 8:
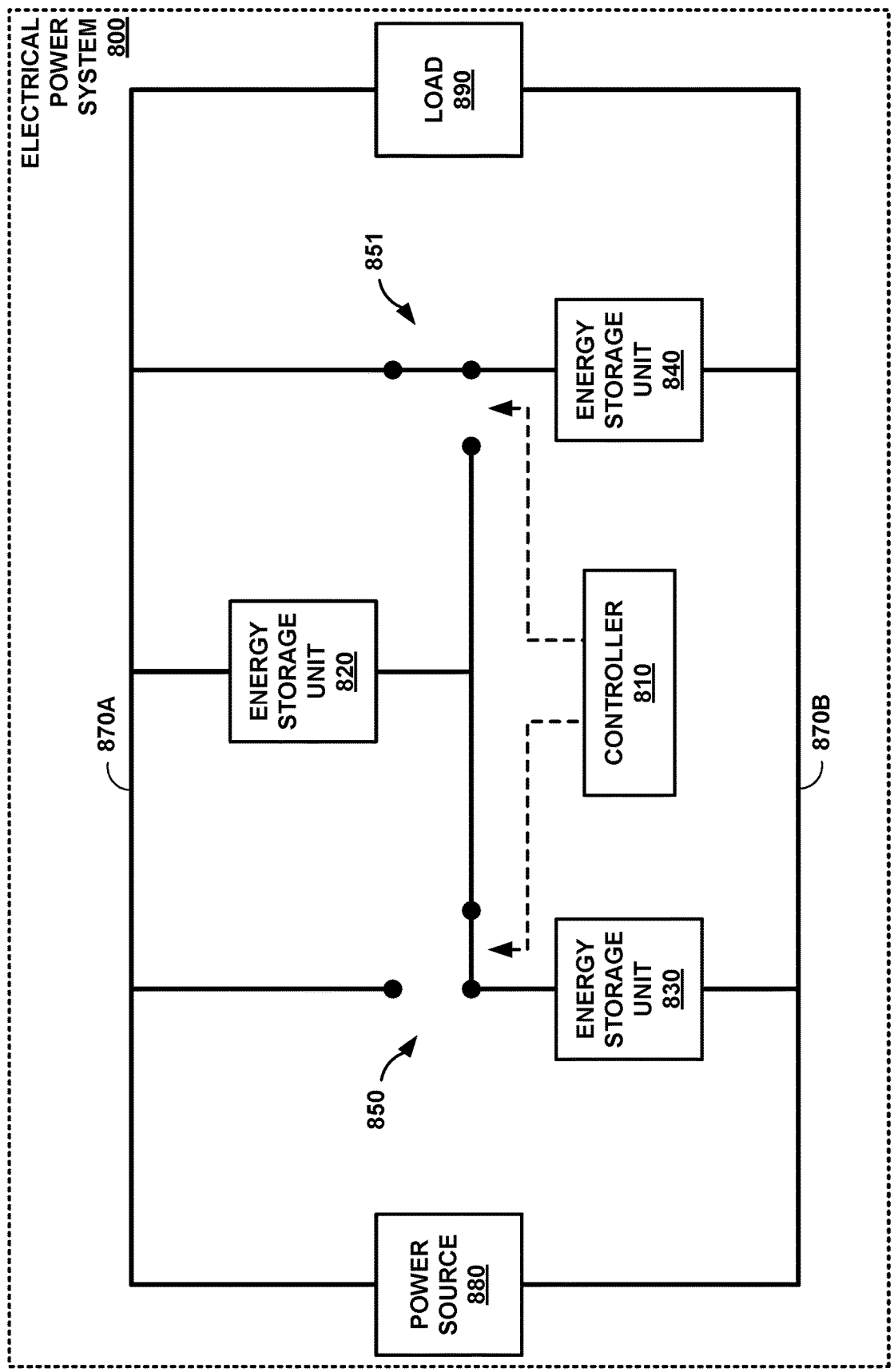
FIG. 8 shows an electrical power system including two main energy storage units and a booster storage unit.

FIG. 8 shows an electrical power system 800 including two main energy storage units 830 and 840 and a booster storage unit 820. In some examples, each of energy storage units 830 and 840 include one or more lithium-ion batteries, and booster energy storage unit 820 includes one or more sodium-ion batteries. Booster energy storage unit 820 can include any battery capable of delivering high power, having a long life, and having relatively low risk of a fire or explosion. For example, booster energy storage unit 820 may have a maximum sustained power per energy of more than ten, twenty, thirty, or forty watts per watt-hour. Booster energy storage unit 820 may also have a lifespan in excess of ten thousand, twenty thousand, fifty thousand, or one hundred thousand cycles.

Storage units 820, 830, and 840 may all have the same chemistry or may have two or more different chemistries. For example, electrical power system 800 may include storage units with a single chemistry (e.g., lithium ion or sodium ion) connected in series or in parallel. Additionally or alternatively, electrical power system 800 can include storage units with multiple chemistries in series or in parallel. Electrical power system 800 may also include multiple chemistries in parallel and series, where each parallel string may include one or multiple chemistries. Having multiple chemistries in parallel and series allows electrical power system 800 to leverage the benefits of each storage-unit chemistry, such as power density, cost, lifespan, safety, and so on. For example, electrical power system 100 can use lithium ion batteries as base-level storage and use sodium ion batteries as extra storage.

Further, employing storage units having multiple different types of battery chemistries in varying profiles and configurations may provide some technical advantages. These may include selection of chemistries for optimization for high power density versus energy density, and series versus parallel connections to accommodate varied charge/discharge requirements. Selection of chemistry and method of connection in combination with management of state and rate of charge/discharge of each subset may provide significant technical advantages including: meeting short duration torque and regenerative braking requirements in traction applications, extension of cell life, faster response to step load changes, faster charging and discharging, deeper discharges of high power storage components, etc.

Controller 810 is configured to control switches 850 and 851 (e.g., static transfer switches) to connect energy storage units 830 and 840 to differential lines 870A and 870B and/or energy storage unit 820. In the example shown in FIG. 8, controller 810 has operated switches 850 and 851 to connect energy storage unit 830 in series with energy storage unit 820. Thus, in the example configuration shown in FIG. 8, the sum of the voltages across energy storage units 820 and 830 is equal to the voltage between differential lines 870A and 870B, as shown in Equation (1).

$$V_{820} + V_{830} = V_{870A} - V_{870B} \quad (1)$$

In the example shown in FIG. 8, controller 810 has operated switches 850 and 851 to connect energy storage unit 840 directly between differential lines 870A and 870B.

However, in some examples, additional capacitive, resistive, inductive, and/or active elements that are not shown in FIG. 8 may be coupled to energy storage unit 840 between differential lines 870A and 870B. Energy storage unit 840 is connected in parallel with the series combination of energy storage units 820 and 830. The voltage across energy storage unit 840 may be equal to the voltage between differential lines 870A and 870B, as shown in Equation (2).

$$V_{840} = V_{870A} - V_{870B} \quad (2)$$

According to Equations (3) and (4), the normal voltage level supplied by power source 880 is greater than the maximum combined voltage level across energy storage units 820 and 830.

$$V_{880\text{-}normal} = V_{820\text{-}max} + V_{830\text{-}max} \quad (3)$$

$$V_{830\text{-}max} = V_{840\text{-}max} \quad (4)$$

Lithium-ion batteries (e.g., energy storage units 830 and 840) may have a more stable state of charge and experience steady charging and discharging, as compared to a sodium-ion battery. Sodium-ion batteries (e.g., energy storage unit 820) may be capable of meeting voltage changes in differential lines 870A and 870B before lithium-ion batteries can meet the change in voltage. Sodium-ion batteries may be capable of withstanding a larger number of cycles than lithium-ion batteries.

Using the topology of electrical power system 800, energy storage unit 830 or 840 will be available to charge at any time. In the example of FIG. 8, energy storage unit 840 can be charged by differential lines 870A and 870B, while energy storage units 820 and 830 can discharge to differential lines 870A and 870B. The discharge of energy storage units 820 and 830 can smooth out the fluctuations in the voltage across differential lines 870A and 870B.

When power source 880 supplies a stable voltage, controller 810 may perform minimal switching of switches 850 and 851. For example, when the voltage across energy storage unit 830 is less than the voltage across energy storage unit 840, controller 810 can operate switches 850 and 851 to connect energy storage unit 840 in series with energy storage unit 820 and to disconnect energy storage unit 830 from energy storage unit 820. As a result, controller 810 can switch between charging energy storage unit 840 and discharging energy storage unit 830 in a first configuration and charging energy storage unit 830 and discharging energy storage unit 840 in a second configuration.

Figure 9:
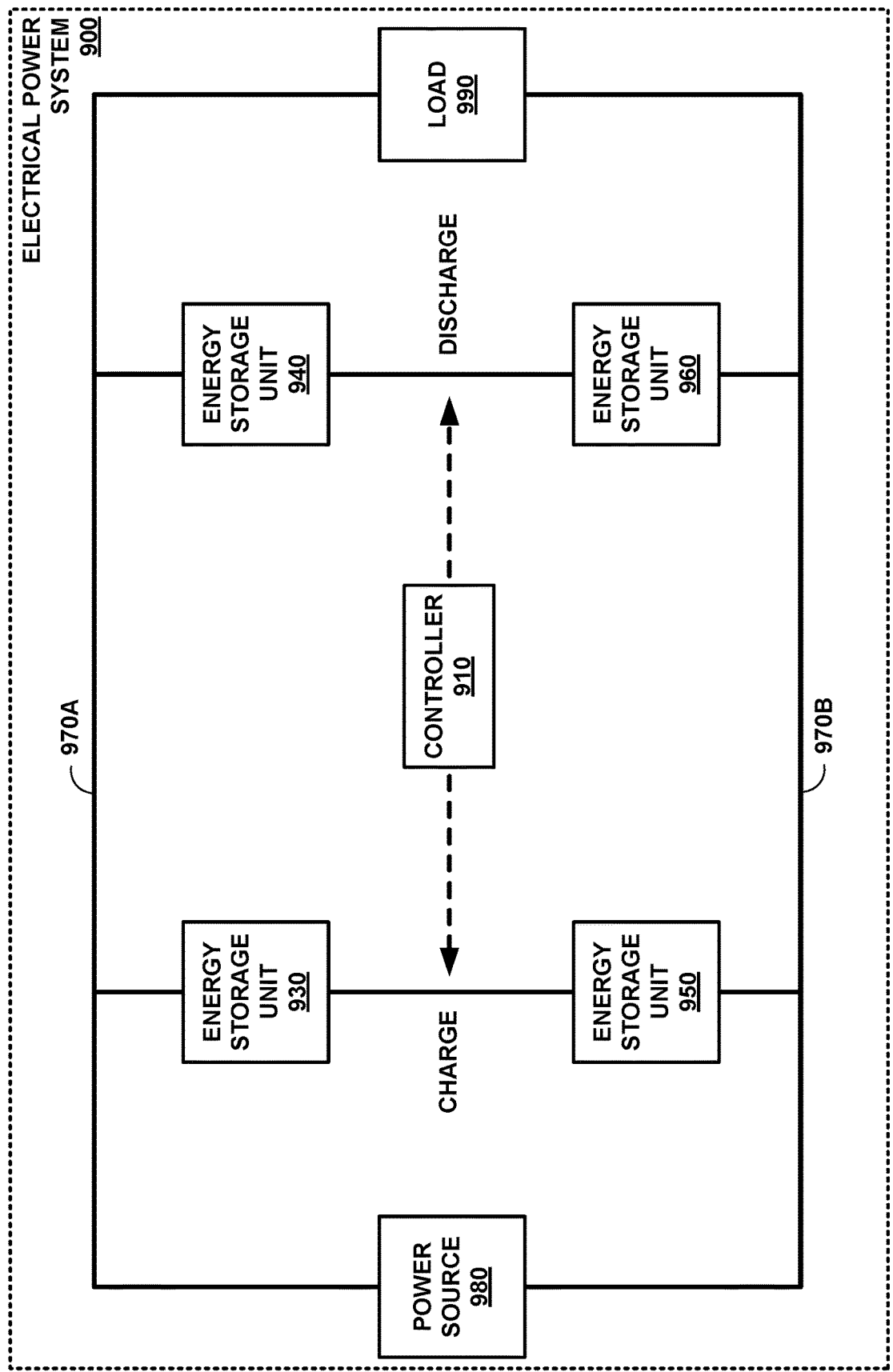
FIG. 9 shows electrical power system including two main energy storage units and two booster storage units.

FIG. 9 shows electrical power system 900 including two main energy storage units 950 and 960 and two booster storage units 930 and 940. In some examples, each of energy storage units 930 and 940 includes one or more sodium-ion batteries, and each of energy storage units 950 and 960 includes one or more lithium-ion batteries. Controller 910 may be configured to operate as a charge manager by controlling whether energy storage units 930, 940, 950, and 960 charge or discharge. For example, controller 910 can cause energy storage units 930 and 950 to charge by connecting energy storage units 930 and 950 in parallel between differential lines 970A and 970B. Controller 910 can cause energy storage units 940 and 960 to charge by connecting energy storage units 940 and 960 in series between differential lines 970A and 970B.

Figure 10:
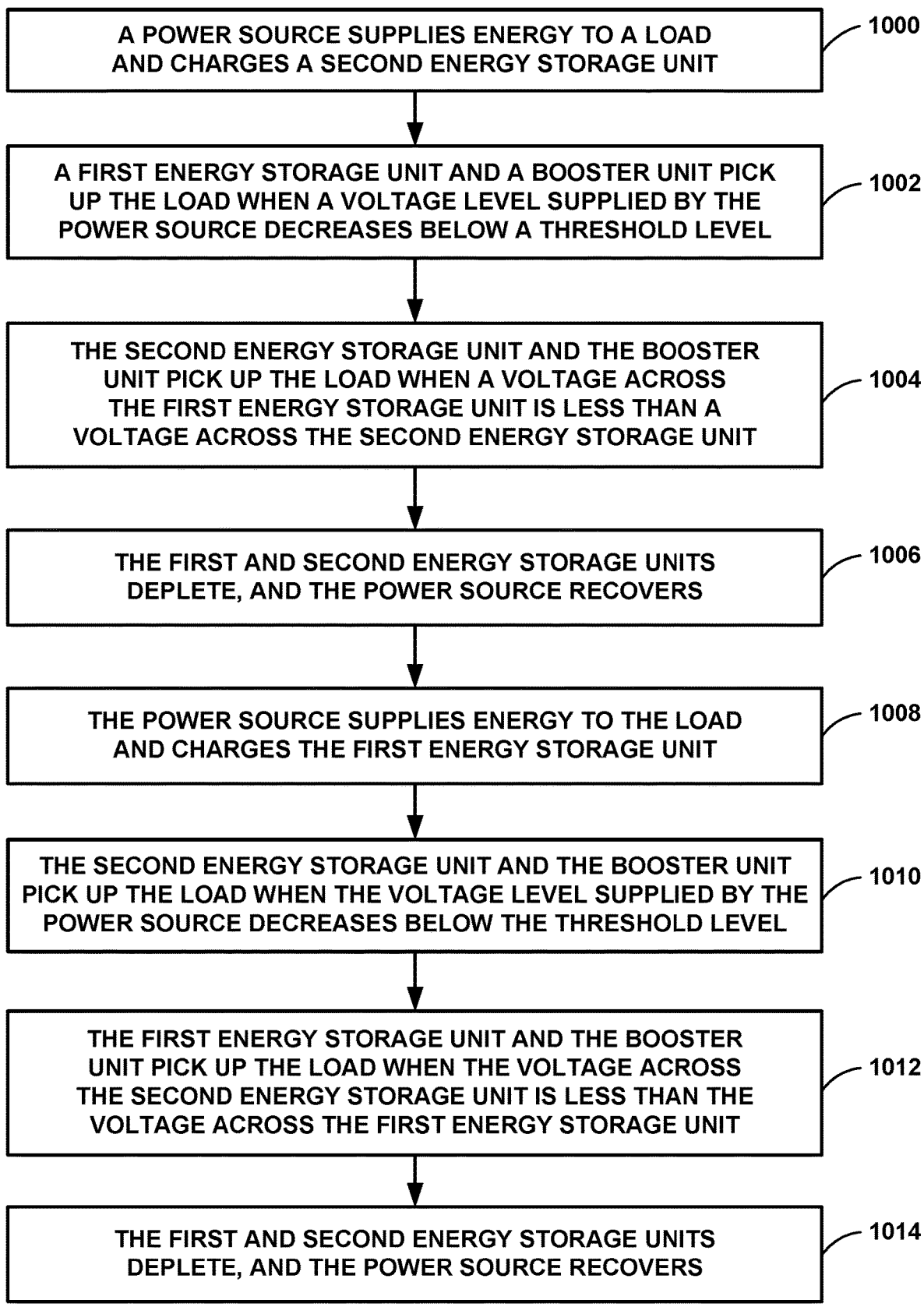
FIG. 10 shows a flowchart of an example process for using energy storage units to provide smooth electrical power to a load.

FIG. 10 shows a flowchart of an example process for using energy storage units to provide smooth electrical power to a load. The techniques of FIG. 10 are described with reference to controller 810 shown in FIG. 8, although other components may exemplify similar techniques. FIG. 10 includes operations 1000 through 1014, which may be performed in a different order than what is shown in FIG. 10. Additional operations, beyond operations 1000 through 1014, may be performed in other examples. Controller 810 may be configured to perform any of operations 1000 through 1014, or any and all other techniques described with respect to FIG. 10.

In the example of FIG. 10, power source 880 supplies energy to load 890 and charges energy storage unit 840 (1000). Power source 880 supplies energy to load 890 through differential lines 870A and 870B and charges energy storage unit 840 through switch 851. In the example shown in FIG. 8, energy storage unit 840 is connected directly between differential lines 870A and 870B so that energy storage unit 840 may bear the entire voltage difference between differential lines 870A and 870B. Thus, the voltage across energy storage unit 840 may be pulled up to the voltage level of differential line 870B.

In the example of FIG. 10, energy storage units 820 and 830 pick up load 890 when a voltage level supplied by power source 880 decreases below a threshold level (1002). Controller 810 can connect energy storage units 820 and 830 in series by operating switches 850 and 851. When energy storage units 820 and 830 are connected in series, energy storage units 820 and 830 can discharge or release energy to differential lines 870A and 870B when the voltage across differential lines 870A and 870B drops below the sum of the voltages across energy storage units 820 and 830.

In the example of FIG. 10, energy storage units 830 and 840 pick up load 890 when a voltage level across energy storage unit 830 is less than a voltage level across energy storage unit 840 (1004). Controller 810 may be configured to receive sensed signals indicating the voltages across the energy storage units 820, 830, and 840. In response to determining that the voltage across energy storage unit 830 is less than the voltage across energy storage unit 840, controller 810 may be configured to operate switches to connect energy storage unit 840 in series with energy storage unit 820. By connecting the energy storage unit that has a greater voltage level in series with energy storage unit 820, controller 810 can provide support for dips in the power supplied by power source 880. In some examples, controller 810 may operate with hysteresis when comparing the voltage levels across energy storage units 830 and 840.

In the example of FIG. 10, energy storage units 830 and 840 deplete as energy storage units 830 and 840 pick up load 890, and the voltage level supplied by power source 880 eventually recovers (1006). The decrease in the voltage level supplied by power source 880 may be a temporary event caused by an interruption or a spike in power consumption. When power source 880 recovers, power source 880 supplies energy to load 890 and charges energy storage unit 830 (1008). Controller 810 connects energy storage unit 840 in series with energy storage unit 820, so that energy storage units 830 and 840 alternate between being connected in series with energy storage unit 820. Energy storage units 820 and 840 picks up or support the voltage level delivered to load 890 when the voltage level supplied by power source 880 decreases below the threshold level (1010).

Energy storage units 820 and 830 support the voltage level delivered to load 890 when the voltage across energy storage unit 840 is less than the voltage across energy storage unit 830 (1012). In response to determining that the voltage across energy storage unit 840 is less than the voltage across energy storage unit 830, controller 810 may be configured to operate switches to connect energy storage unit 840 in series with energy storage unit 820. Energy storage units 830 and 840 deplete as energy storage units 830 and 840 supports the voltage delivered to load 890, and the voltage level supplied by power source 880 eventually recovers (1014). Controller 810 can restart the example process of FIG. 10 by connecting energy storage unit 830 in series with energy storage unit 840.

Figure 11A:
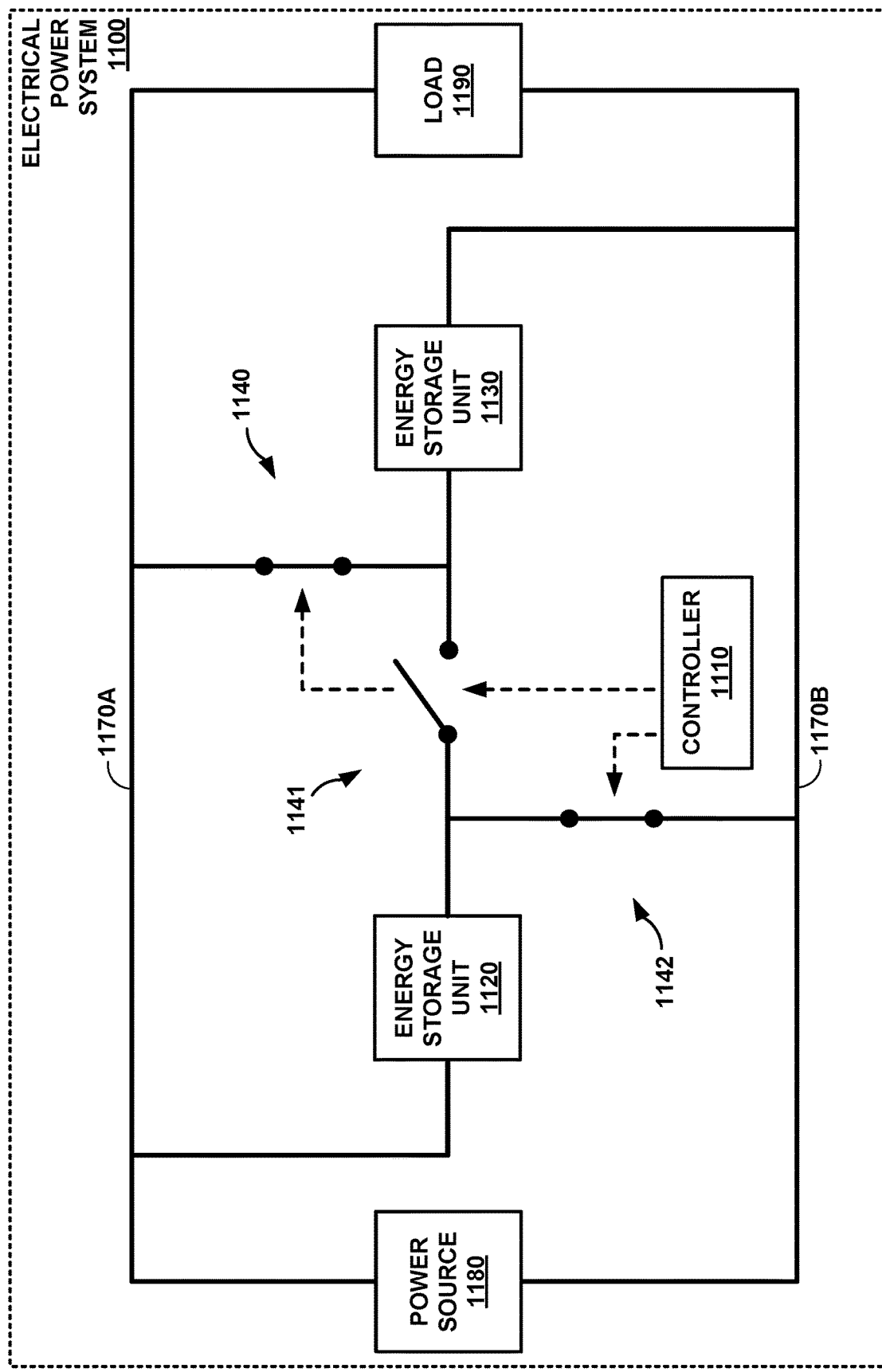
FIGS. 11A and 11B show an electrical power system including two energy storage units that can be connected in parallel or in series.
Figure 11B:
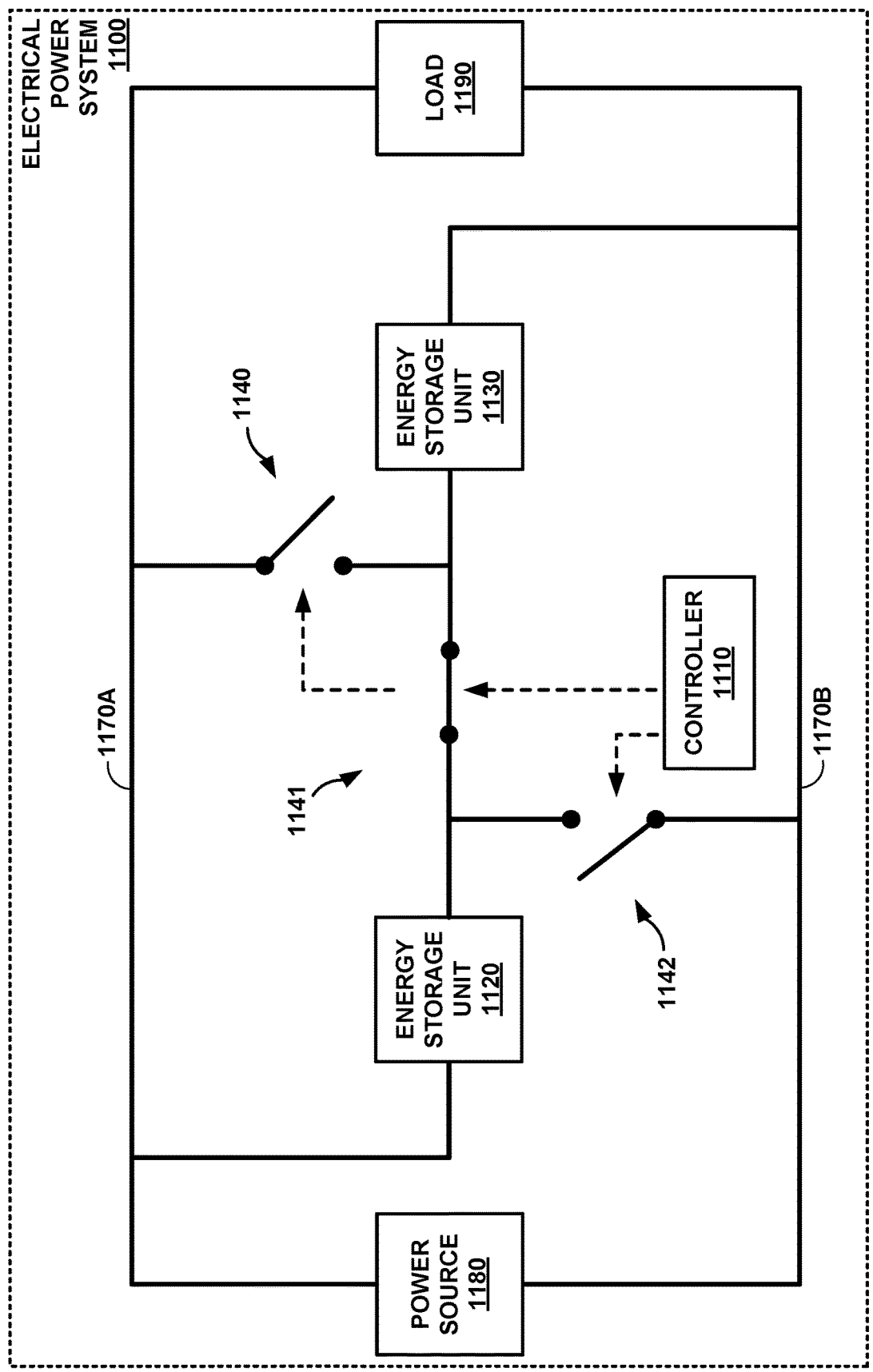

FIGS. 11A and 11B show an electrical power system 1100 including two energy storage units 1120 and 1130 that can be connected in parallel or in series. In the example shown in FIG. 11A, controller 1110 has activated switches 1140 and 1142 and deactivated switch 1141 so that energy storage units 1120 and 1130 are connected in parallel. In the example shown in FIG. 11A, each of energy storage units 1120 and 1130 are connected between differential lines 1170A and 1170B so that the voltage drop across each of energy storage units 1120 and 1130 is approximately equal to the voltage difference between differential lines 1170A and 1170B. Although FIGS. 11A and 11B show a three-switch configuration for connecting energy storage units 1120 and 1130 in series or in parallel, other switching configurations can be used to In some examples, each of energy storage units 1120 and 1130 includes one or more ultra-capacitors. An ultra-capacitor may be capable of being depleted beyond the point that the voltage across the ultra-capacitor falls below system an acceptable minimum level. Ultra-capacitors can deplete below the minimum voltage level without damage in some examples. In response to determining that the voltage across one of energy storage units 1120 and 1130 drops below the acceptable system limit, controller 1110 may be configured to connect energy storage units 1120 and 1130 in series, as shown in FIG. 11B. Connecting energy storage units 1120 and 1130 can result in a boost to the stored voltage levels and cause energy storage units to provide additional marginal energy out to electrical power system 1100.

During a discharge phase in which energy storage units 1120 and 1130 release energy to electrical power system 1100, controller 1110 can first connect energy storage units 1120 and 1130 in parallel before switching to connecting energy storage units 1120 and 1130 in series when energy storage unit 1120 or 1130 depletes below an acceptable level. In the example shown in FIG. 11B, controller 1110 activates switch 1141 and deactivates switches 1140 and 1142 to connect energy storage units 1120 and 1130 in series between differential lines 1170A and 1170B. Connecting energy storage units 1120 and 1130 in series during the discharge phase can provide the release of further energy from energy storage units 1120 and 1130 to electrical power system 1100.

During a charge phase in which energy storage units 1120 and 1130 receive and store energy from electrical power system 1100, controller 1110 can first connect energy storage units 1120 and 1130 in series without increasing the charging capacity. Connecting energy storage units 1120 and 1130 in series allows for charging at lower voltages on differential lines 1170A and 1170B. In response to determining that the voltage across energy storage units 1120 and 1130 is greater than a threshold level, and/or in response to determining that the voltage across energy storage units 1120 and 1130 has turned the corner or knee of the voltage-current charging curve (e.g., higher voltage and lower current), controller 1110 may be configured to connect energy storage units 1120 and 1130 in parallel.

Figure 12:
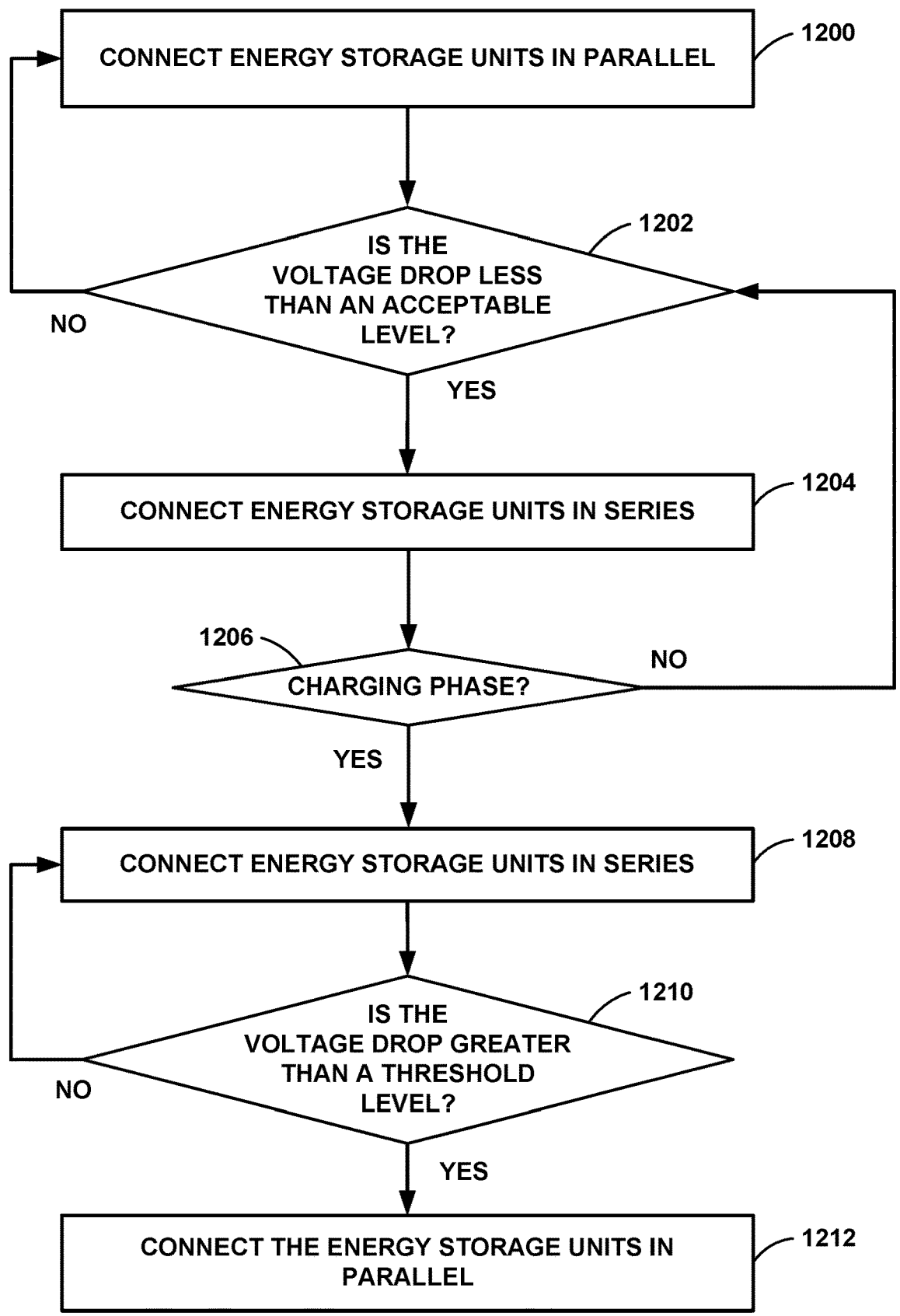
FIG. 12 a flowchart of an example process for using energy storage units to provide smooth electrical power to a load.

FIG. 12 a flowchart of an example process for using energy storage units to provide smooth electrical power to a load. The techniques of FIG. 12 are described with reference to controller 1110 shown in FIGS. 11A and 11B, although other components may exemplify similar techniques. FIG. 12 includes operations 1200 through 1212, which may be performed in a different order than what is shown in FIG. 12. Additional operations, beyond operations 1200 through 1212, may be performed in other examples. Controller 1110 may be configured to perform any of operations 1200 through 1212, or any and all other techniques described with respect to FIG. 12.

In the example of FIG. 12, controller 1110 connects energy storage units 1120 and 1130 in parallel, as shown in FIG. 11A (1200). Controller 1110 can control switches 1140-1142 to connect energy storage units 1120 and 1130 in parallel between differential lines 1170A and 1170B to release stored energy when there is sufficient voltage across both of energy storage units 1120 and 1130. Controller 1110 then determines whether the voltage drop across energy storage units 1120 and 1130 is less than an acceptable level (1202). In response to determining that the voltage drop across energy storage units 1120 and 1130 is not less than the acceptable level (the "NO" branch of block 1202), controller 1110 can continue to connect energy storage units 1120 and 1130 in parallel.

In response to determining that the voltage drop across energy storage units 1120 and 1130 is less than an acceptable level (the "YES" branch of block 1202), controller 1110 connects energy storage units 1120 and 1130 in series between differential lines 1170A and 1170B (1204). Connecting energy storage units 1120 and 1130 in series resulting in stacking, summing, or combining the voltage drops across each of energy storage units 1120 and 1130, as Equation (5). Thus, when connected in series, energy storage units 1120 and 1130 can smooth out any fluctuations on differential lines 1170A and 1170B at higher voltage levels, as compared to when energy storage units 1120 and 1130 are connected in parallel. As long as electrical power system 1100 remains in discharging phase (the "NO" branch of block 1206), controller 1110 controls switches 1140-1142 based on whether the voltage drop across energy storage units 1120 and 1130 is less than the acceptable level.

$$V_{1170A} - V_{1170B} = V_{1120} + V_{1130} \text{ (in FIG. 11A)} \quad (5)$$

When electrical power system 1100 transitions to a charging phase (the "YES" branch of block 1206), controller 1110 operates switches 1140-1142 to connect energy storage units 1120 and 1130 in series (1208). Controller 1110 then determines whether the voltage drop across energy storage units 1120 and 1130 is greater than a threshold level (1210). The threshold level of block 1210 may be the same or different than the acceptable level discussed with respect to block 1202. In response to determining that the voltage drop across energy storage units 1120 and 1130 is not greater than the threshold level (the "NO" branch of block 1210), controller 1110 can continue to connect energy storage units 1120 and 1130 in series. In response to determining that the voltage drop across energy storage units 1120 and 1130 is greater than the threshold level (the "YES" branch of block 1210), controller 1110 can connect energy storage units 1120 and 1130 in parallel (1212). When connected in parallel, energy storage units 1120 and 1130 can charge to a higher voltage, as shown by Equation (6), as compared to when energy storage units 1120 and 1130 are connected in series.

$$V_{1170A} - V_{1170B} = V_{1120} = V_{1130} \text{ (in FIG. 11}B\text{)} \tag{6}$$

The energy storage units shown in FIGS. 8, 9, 11A, and 11B can be used in electrical power systems 100, 200, 300, 400, and 700. Energy storage units 820, 830, 840, 930, 940, 950, 960, 1120, and/or 1130 may be used along a transmission line or an electrical bus between a power source and a load to compensate for spikes and dips in the supply power or supply voltage. Although each of energy storage units 820, 830, 840, 930, 940, 950, 960, 1120, and 1130 is depicted in FIGS. 8, 9, 11A, and 11B as a single energy storage unit, any or all of energy storage units 820, 830, 840, 930, 940, 950, 960, 1120, and/or 1130 may include one or more energy storage subunits (e.g., capacitors, batteries, etc.) with the same or differing chemistries connected in series and/or parallel. Thus, the depiction of a single energy storage unit in the drawings does not preclude the use of multiple storage units, including storage units having more than one chemistry, from being used.

A controller may be configured to alternate between connecting energy storage units in parallel and in series to smooth out fluctuations in the line voltage. Additionally or alternatively, the controller can operate the switches to control the state of charge within each energy storage unit. By controlling the state of charge in the energy storage units, the controller can prevent an energy storage unit from becoming too fully charged and can preserve the ability of the energy storage unit to absorb additional energy. The controller may also be able to prevent an energy storage unit from becoming too depleted by preferentially using other energy storage units under discharge mode. The controller may be configured to preferentially choose a particular type of energy storage unit to be in charging or discharging mode based on various considerations such as the relative abilities of each energy storage unit to charge/discharge at high rates. The controller can operate the switches to additionally prevent or reduce fluctuations in line voltage, allow deeper energy discharge of selected distributed storage assets, and/or provide coordinated flexibility in rates of charge and discharge to/from individual or multiple distributed storage assets.

The techniques described throughout may be implemented by or as any one of a method, a device and a system according to the principles of the present disclosure. In addition, the techniques described throughout may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules. Software modules may include learning, predictive and response functions of artificial intelligence systems to enhance the functionality of the overall system.

What is claimed is:

1. An electrical power system comprising:
   a power source;
   a load modulator configured to:
   receive power from the power source via a circuit breaker; and
   deliver the power to a load zone and to a direct current (DC) bus; and
   a controller configured to:
   determine the power flowing through the circuit breaker;
   determine a software-controlled power flow limit for the load zone;
   cause the power delivered to the load zone to remain below the software-controlled power flow limit;
   determine the power delivered to the load zone; and
   divert excess power to the DC bus, wherein the excess power is a difference between the power flowing through the circuit breaker and the power delivered to the load zone, and wherein the DC bus is coupled to one of an alternative load and a first energy storage unit.

2. The electrical power system of claim 1, wherein the circuit breaker is coupled between the power source and the load modulator.

3. The electrical power system of claim 1, wherein the controller is further configured to:
   apply a ruleset to a signal indicating a voltage or a current delivered to the load zone; and
   adjust the software-controlled power flow limit based on applying the ruleset to the signal indicating the voltage or the current delivered to the load zone.

4. The electrical power system of claim 1, wherein the controller is further configured to adjust the software-controlled power flow limit based on the power delivered to the load zone or based on the power delivered to or received from the first energy storage unit.

5. The electrical power system of claim 1, wherein the controller is further configured to adjust the software-controlled power flow limit in response to determining that the power delivered to the load zone exceeds the software-controlled power flow limit.

6. The electrical power system of claim 1, wherein the controller is further configured to adjust the software-controlled power flow limit by temporarily increasing the software-controlled power flow limit.

7. The electrical power system of claim 1, wherein the controller is further configured to communicate an indication of the software-controlled power flow limit to the load zone.

8. The electrical power system of claim 1, wherein the controller is further configured to limit the power delivered to the load zone to the software-controlled power flow limit or a buffer magnitude above the software-controlled power flow limit.

9. The electrical power system of claim 1, wherein the controller is further configured to reduce a voltage of the power delivered to the load zone in response to determining that the power delivered to the load zone exceeds the software-controlled power flow limit.

10. The electrical power system of claim 1, further comprising:
two differential lines along which the power is delivered from the power source to the load zone;
the first energy storage unit;
a second energy storage unit; and
a booster unit,
wherein the controller is further configured to:
connect the first energy storage unit in series with the booster unit between the two differential lines;
determine that a voltage drop across the first energy storage unit is less than a voltage drop across the second energy storage unit; and
connect the second energy storage unit in series with the booster unit between the two differential lines in response to determining that the voltage drop across the first energy storage unit is less than the voltage drop across the second energy storage unit.

11. The electrical power system of claim 1,
two differential lines along which the power is delivered from the power source to the load zone;
the first energy storage unit; and
a second energy storage unit,
wherein the controller is further configured to:
connect, during a discharging phase, the first energy storage unit in parallel with the second energy storage unit between the two differential lines;
determine that, during the discharging phase, a voltage drop across the first energy storage unit or a voltage drop across the second energy storage unit is less than an acceptable voltage level; and
connect the first energy storage unit in series with the second energy storage unit between the two differential lines in response to determining that the voltage drop across the first energy storage unit or the voltage drop across the second energy storage unit is less than the acceptable voltage level.

12. The electrical power system of claim 1,
two differential lines along which the power is delivered from the power source to the load zone;
the first energy storage unit; and
a second energy storage unit,
wherein the controller is further configured to:
connect, during a charging phase, the first energy storage unit in series with the second energy storage unit between the two differential lines;
determine that, during the charging phase, a combined voltage drop across the first energy storage unit and the second energy storage unit is less than a threshold voltage level; and
connect the first energy storage unit in parallel with the second energy storage unit between the two differential lines in response to determining that the combined voltage drop across the first energy storage unit and the second energy storage unit is less than the threshold voltage level.

13. A method comprising:
receiving power from a power source via a circuit breaker;
delivering the power to a first load and to a direct current (DC) bus;
determining the power flowing through the circuit breaker;
determining a software-controlled power flow limit for the first load;
causing the power delivered to the first load to remain below the software-controlled power flow limit;
determining the power delivered to the first load; and
diverting excess power to the DC bus, wherein the excess power is a difference between the power flowing through the circuit breaker and the power delivered to the first load, and wherein the DC bus is coupled to one of a second load and a first energy storage unit.

14. The method of claim of claim 13, further comprising:
applying a ruleset to a signal indicating a voltage or a current delivered to the first load; and
adjusting the software-controlled power flow limit based on applying the ruleset to the signal indicating the voltage or the current delivered to the first load.

15. The method of claim 13, further comprising adjusting the software-controlled power flow limit based on the power delivered to the first load or based on a power flow to or from the first energy storage unit.

16. The method of claim 13, further comprising:
connecting the first energy storage unit in series with a booster unit between two differential lines along which the power is delivered from the power source to the first load;
determining that a voltage drop across the first energy storage unit is less than a voltage drop across a second energy storage unit; and
connecting the second energy storage unit in series with the booster unit between the two differential lines in response to determining that the voltage drop across the first energy storage unit is less than the voltage drop across the second energy storage unit.

17. The method of claim 13, further comprising:
connecting, during a discharging phase, the first energy storage unit in parallel with a second energy storage unit between two differential lines along which the power is delivered from the power source to the first load;
determining that, during the discharging phase, a voltage drop across the first energy storage unit or a voltage drop across the second energy storage unit is less than an acceptable voltage level; and connecting the first energy storage unit in series with the second energy storage unit between the two differential lines in response to determining that the voltage drop across the first energy storage unit or the voltage drop across the second energy storage unit is less than the acceptable voltage level.

18. The method of claim 13, further comprising:

connecting, during a charging phase, the first energy storage unit in series with a second energy storage unit between two differential lines along which the power is delivered from the power source to the first load;

determining that, during the charging phase, a combined voltage drop across the first energy storage unit and the second energy storage unit is less than a threshold voltage level; and connecting the first energy storage unit in parallel with the second energy storage unit between the two differential lines in response to determining that the combined voltage drop across the first energy storage unit and the second energy storage unit is less than the threshold voltage level.

19. A device comprising a computer-readable medium having executable instructions stored thereon, configured to be executable by processing circuitry for causing the processing circuitry to:

determine power received from a power source flowing via a circuit breaker for delivery to a load and to a direct current (DC) bus;

determine a software-controlled power flow limit for the load;

cause the power delivered to the load to remain below the software-controlled power flow limit;

determine the power delivered to the load; and divert excess power to the DC bus, wherein the excess power is a difference between the power flowing through the circuit breaker and the power delivered to the load, and wherein the DC bus is coupled to one of an alternative load and a first energy storage unit.

20. The device of claim 19, wherein the instructions are configured to be executable by the processing circuitry for further causing the processing circuitry to:

connect the first energy storage unit in series with a booster unit between two differential lines along which the power from the power source is delivered to the load;

determine that a voltage drop across the first energy storage unit is less than a voltage drop across a second energy storage unit; and connect the second energy storage unit in series with the booster unit between the two differential lines in response to determining that the voltage drop across the first energy storage unit is less than the voltage drop across the second energy storage unit.

* * * * *